United States Patent [19]

Bailly et al.

[11] Patent Number: 4,487,846

[45] Date of Patent: Dec. 11, 1984

[54] PROCESS FOR THE PREPARATION OF CATALYST SUPPORTS FOR THE POLYMERIZATION OF ALPHA-OLEFINS AND THE SUPPORTS OBTAINED

[75] Inventors: Jean C. Bailly, Martigues; Joelle Collomb, Marseilles, both of France

[73] Assignee: BP Chimie Society Anonyme, Courbevoie, France

[21] Appl. No.: 505,076

[22] Filed: Jun. 16, 1983

[30] Foreign Application Priority Data

Jun. 24, 1982 [FR] France .................. 82 11054

[51] Int. Cl.³ .................... C08F 4/02
[52] U.S. Cl. .................... 502/154; 502/153; 502/104; 502/110; 502/115; 502/121; 502/122; 502/123; 502/128; 502/132; 502/134; 502/162; 502/167; 502/168; 502/169; 502/226; 502/126; 526/125
[58] Field of Search .......... 502/226, 169, 153, 154, 502/162, 167, 168, 104, 110, 115, 134, 126, 132, 121, 122, 123, 128

[56] References Cited

U.S. PATENT DOCUMENTS

| | | | |
|---|---|---|---|
| 4,220,554 | 9/1980 | Scata et al. | 252/429 B |
| 4,250,288 | 2/1981 | Lowery et al. | 502/128 X |
| 4,252,670 | 2/1981 | Caunt et al. | 252/429 B |
| 4,314,912 | 2/1982 | Lowery et al. | 502/128 X |
| 4,329,253 | 5/1982 | Goodall et al. | 252/429 B |
| 4,364,851 | 12/1982 | Shiga et al. | 502/169 X |
| 4,399,054 | 8/1983 | Ferraris et al. | 252/429 B |
| 4,414,132 | 11/1983 | Goodall et al. | 502/169 |

FOREIGN PATENT DOCUMENTS

| | | |
|---|---|---|
| 24933 | 3/1981 | European Pat. Off. |
| 2014887 | 4/1970 | France |
| 2143346 | 2/1973 | France |
| 1580635 | 12/1980 | United Kingdom |

Primary Examiner—Patrick Garvin
Attorney, Agent, or Firm—Brooks, Haidt, Haffner & Delahunty

[57] ABSTRACT

The present invention relates to catalyst supports for the polymerization and co-polymerization of alpha-olefins, especially ethylene and propylene, consisting essentially of magnesium chloride, characterized in that these supports contain a chlorinated compound of aluminium in a quantity such that the atomic ratio of Al/Mg is comprised between 0.001 and 0.1 and that they occur in the form of spheroidal particles having a mean diameter by mass comprised between 10 and 100 microns and a narrow and controllable particle size distribution such that the ratio of the mean diameter by mass to the mean diameter by number of particles is less than or equal to 3, and also a process for the preparation of these supports.

21 Claims, No Drawings

PROCESS FOR THE PREPARATION OF CATALYST SUPPORTS FOR THE POLYMERIZATION OF ALPHA-OLEFINS AND THE SUPPORTS OBTAINED

The present invention relates to supports consisting of magnesium chloride intended for the preparation of catalysts for the polymerisation and co-polymerisation of alpha-olefins, and also to a process for the preparation of these supports.

It is known that polymerisation catalysts for alpha-olefins, known as Ziegler-Natta catalysts, are obtained by the combination of transition metal compounds belonging to Groups IV, V or VI of the Periodic Table with organometallic compounds of Groups I to III of the Table.

It is known that the properties of these catalysts may be improved if the said transition metal compound is used with a solid mineral compound. This solid mineral compound may be co-precipitated with the said transition metal compound or may be employed as a support for the said transition metal compound.

As solid mineral compound which can be used as support the oxides of magnesium and titanium, aluminium silicate, magnesium carbonate and magnesium chloride, for example, may be mentioned.

In this technique, in which the solid mineral compound is used as support, it is essential that this support should possess a set of specific properties so that the catalyst itself is reproducible, easy to handle, has a high yield, is possibly stereospecific, all at the same time. This is the reason why many works have been concerned with processes for the preparation of these supports.

In the more particular cases where the support is magnesium chloride, various preparation processes have been put forward. For example, the preparation of anhydrous magnesium chloride from an organomagnesium compound has for long been described; indeed, it is well known in organic chemistry that the reaction of an organomagnesium compound with a mineral or organic or organoaluminium halogenated compound gives rise to small (elementary) particles of magnesium chloride. The pulverisation dehydration of a hydrated magnesium chloride has also been described. Lastly, the pulverisation of particles of magnesium chloride, possibly in the presence either of a reagent or of a metal compound of the transition metal has been described.

The present invention relates to a process for the preparation of particles of magnesium chloride ($MgCl_2$) of spheroidal shape and controllable particle size, these particles being utilisable to advantage as supports for the production of polymerisation catalysts for alpha-olefins.

These magnesium chloride particles are obtained by a decomposition reaction, in itself known, in a liquid hydrocarbon medium, of an organo-magnesium derivative by a chlorinated organic compound, but complying with the following conditions:

the organo-magnesium derivative used is a derivative of the formula $R_1MgR_2 \cdot xAl(R_3)_3$, in which $R_1$, $R_2$ and $R_3$ are alkyl radicals having 2 to 12 carbon atoms, and x is comprised between 0.001 and 10, preferably between 0.01 and 2, the chlorinated organic compound is an alkyl chloride of the formula $R_4Cl$ in which $R_4$ is a secondary or preferably tertiary alkyl having 3 to 12 carbon atoms, the molar ratio between this chlorinated organic compound and the organo-magnesium derivative being comprised between $1.5(1+3/2x)$ and $2.5(1+3/2x)$, the reaction is carried out in the presence of an electron donor compound comprising at least one atom of oxygen, sulphur, nitrogen and/or phosphorus, in a quantity such that the molar ratio between this electron donor compound and the organo-magnesium derivative is comprised between 0.01 and 2 and preferably between 0.01 and 1, the reaction takes place under agitation in a liquid hydrocarbon at a temperature comprised between 5° C. and 80° C.

The organomagnesium derivative employed must in fact comprise an organomagnesium compound of the formula $R_1MgR_2$ and a sufficient quantity of an alkylaluminium compound of the formula $Al(R_3)_3$, in which $R_1$, $R_2$ and $R_3$ are identical or different alkyl radicals having 2 to 12 carbon atoms. It is in fact known that between the compound $R_1MgR_2$ and the compound $Al(R_3)_3$ an additional complex is formed: it will therefore be expedient to adapt the relative quantities of $R_1MgR_2$ and $Al(R_3)_3$ in order on the one hand to attain sufficient solubility of the addition complex under the reaction conditions employed and on the other hand to decrease the viscosity of the reaction medium.

The chlorinated organic compound, $R_4Cl$, is an alkyl chloride in which $R_4$ is a secondary or preferably tertiary alkyl radical: the primary $R_4$ alkyl radicals do not make it possible to obtain a suitable result.

The molar ratio between $R_4Cl$ and $R_1MgR_2 \cdot xAl(R_3)_3$ should be comprised between $1.5(1+3/2x)$ and $2.5(1+3/2x)$. If this molar ratio is less than $1.5(1+3/2x)$, the reaction yield decreases notably. On the other hand, it has been found that when this molar ratio increases from $1.5(1+3/2x)$ to $2(1+3/2x)$, the density of the magnesium chloride particles obtained according to the present invention decreases slightly, and then that this density decreases rapidly when this molar ratio increases beyond $2(1+3/2x)$. Now experience has shown that in certain cases it is of interest to employ a catalyst prepared from magnesium chloride particles having a comparatively high density. It is then preferable to observe a molar ratio between chlorinated organic compound and organomagnesium derivative of less than $2(1+3/2x)$ and more especially comprised between $1.85(1+3/2x)$ and $1.95(1+3/2x)$.

Under these conditions it is found that the reaction medium contains, depending on the nature and quantity of the electron donor compound employed, products comprising Mg—C bonds, soluble in the liquid hydrocarbon medium. It is also found that the magnesium chloride particles obtained generally contain, after several washings and extractions by means of the liquid hydrocarbon, products comprising at least one Mg—C bond. Such supports are then particularly useful in the preparation of catalysts intended for the polymerisation or copolymerisation of ethylene.

Experience has likewise shown that the molar ratio $R_4Cl:R_1MgR_2, xAl(R_3)_3$ may be equal to or greater than $1.95(1+3/2x)$, and preferably comprised between $2(1+3/2x)$ and $2.2(1+3/2x)$, and that in this case the magnesium chloride particles obtained do not contain any products having at least one Mg—C bond. They represent particularly useful supports for the preparation of catalysts intended for the polymerisation or copolymerisation of propylene.

Whilst it has already been recommended in Prior Art to prepare catalyst supports by reacting organomagnesium derivatives as defined above with a chlorinated organic compound as above, it has never been indicated that it was desirable to perform this reaction in the presence of an electron donor compound. Now such a presence plays an essential part in obtaining a support having a shape and properties which are of interest. The electron donor compound employed is an organic compound known as such, or as a Lewis base, comprising in particular at least one atom of oxygen, sulphur, nitrogen and/or phosphorus. The electron donor compound may be chosen from among a wide variety of products, such as for example amines, amides, phosphines, sulphoxides, sulphones or ethers. The quantity of electron donor compound to be employed during the reaction depends partly on the nature and quantity of the organomagnesium derivative, and also on the nature of the electron donor compound, particularly its complexing power. Thus, if one chooses an electron donor compound with a high complexing power, such as for example hexamethylphosphorotriamide (HMPA), this compound must be present in a molar quantity of at least about 0.01 mole per mole of $R_1MgR_2.xAl(R_3)_3$ employed. On the other hand, where an electron donor compound with a low complexing power is used, such as for example an ether oxide, the quantity used should be at least 0.03 mole of electron donor compound per mole of $R_1MgR_2.xAl(R_3)_3$ employed. If the quantity of electron donor compound is less than one of these limit values, it is found that the magnesium chloride particles obtained have less regular shapes and a relatively broad particle size distribution. If on the other hand the quantity of electron donor compound is too high, especially equal to or greater than about 2 moles per mole of $R_1MgR_2.xAl(R_3)_3$ employed, it is found that the reaction proceeds less regularly, particularly on starting up, which leads to magnesium chloride particles of an undesired shape and particle size distribution.

Particularly interesting results are obtained when an aliphatic ether oxide is used as the electron donor compound, of the formula $R_5OR_6$ in which $R_5$ and $R_6$ are identical or different alkyl radicals having 1 to 12 carbon atoms, in a quantity such that the molar ratio between this ether oxide and the organomagnesium compound is comprised between 0.03 and 2, and preferably comprised between 0.03 and 1. When an ether-oxide is employed, it is preferred to conduct the reaction in an agitated liquid hydrocarbon medium using a temperature between 35° and 80° C.

The use of the electron donor compound in the reaction may be carried out in various ways depending partly on the actual nature of the electron donor compound and the nature of $R_1MgR_2.xAl(R_3)_3$. In the case of an electron donor compound with a high complexing power, for example, one may add the whole of the said electron donor compound to $R_1MgR_2.xAl(R_3)_3$, or preferably to $R_4Cl$ before the reaction is started up; but one may also divide the electron donor compound between $R_1MgR_2.xAl(R_3)_3$ and $R_4Cl$. If one employs an electron donor compound of low complexing power, such as an ether oxide, this latter may preferably be introduced either in its entirety with $R_1MgR_2.xAl(R_3)_3$, or divided between $R_1MgR_2.xAl(R_3)_3$ and $R_4Cl$; in this latter case it is best to admit, into the liquid hydrocarbon medium and prior to the introduction of the reactants, at least 0.03 mole of the electron donor compound per mole of $R_1MgR_2.xAl(R_3)_3$ employed.

The reaction between $R_1MgR_2.xAl(R_3)_3$ and $R_4Cl$ gives rise to a solid product; a precipitation is thus involved; the specialist knows that in this case physical factors such as the viscosity of the medium, the mode and speed of agitation, the conditions of use of the reactants, the duration of the reaction, all other things being equal, may play an important part in the shape, structure, size and particle size distribution of the abovementioned particles.

This is evidently the case in the present invention and that is why it is stated that:

a. if it is desired to obtain a support with as narrow a particle size distribution as possible, as defined by the ratio of the mean diameter by mass, Dm, the mean diameter by number, Dn, comprised between about 1.1 and 1.5, it is desirable that:
   the reaction should be performed by introducing $R_4Cl$ gradually into the liquid hydrocarbon medium containing $R_1MgR_2.xAl(R_3)_3$,
   the reaction should be performed in the presence of an electron donor compound in a quantity such that the molar ratio between the said electron donor compound and $R_1MgR_2.xAl(R_3)_3$ is less than 1,
   the reaction should be performed in a liquid hydrocarbon agitated at a constant speed through the entire duration of the reaction,
   and, all other things being equal, the reaction should be comparatively slow, of the order of at least one hour, so as to permit of a suitable arrangement of the solid product formed.

b. if it is desired to obtain a support with less narrow particle size distribution than that of the preceding one, such that the ratio Dm:Dn is comprised between 1.5 and 3, and in particular between 1.5 and 2.5, it is desirable that:
   by introducing $R_4Cl$ gradually into the liquid hydrocarbon medium containing $R_1MgR_2.xAl(R_3)_3$, the speed of agitation should be modified at a moment when the quantity of $R_4Cl$ introduced into the reaction medium corresponds to a molar ratio of $R_4Cl:R_1MgR_2.xAl(R_3)_3$ which is equal to or less than 0.25,
   or that the reaction should be performed by introducing in a first stage, in a gradual and simultaneous manner the $R_4Cl$ and $R_1MgR_2.xAl(R_3)_3$ into the liquid hydrocarbon medium in quantities such that at most 50% of the quantities of each of the reactants employed is introduced, then in a second stage, there is introduced first of all the remaining quantity of $R_1MgR_2.xAl(R_3)_3$ rapidly and then the remaining quantity of $R_4Cl$ gradually into the reaction medium,
   and that the speed of agitation should possibly be modified at any moment during the first stage referred to above of gradual and simultaneous addition of $R_4Cl$ and $R_1MgR_2.xAl(R_3)_3$ into the liquid hydrocarbon medium.

When the process described above is implemented, a support is produced which consists of particles containing basically magnesium chloride and having the following properties:
the particles have a spheroidal shape defined by the fact that if D and d are the large and small axes of the particles, D:d is less than or equal to 1.3;
the particles have a mean diameter by mass adjustable at will and comprised between 10 and 100 microns approximately;

the particle size distribution of these particles is such that the ratio of the mean diameter by mass to the mean diameter by number Dm:Dn is controllable at will and is equal to or less than 3 and in particular between 1.1 and 2.5; it is also found that there is a practically total absence of large particles of a diameter greater than 2×Dm and of fine particles of a diameter of less than 0.2×Dm; the particle size distribution can, besides, be such that more than 90% by weight of the particles of each batch are in the range Dm±10%, the surface of the particles may be slightly dented for example "raspberry"-shaped, but is preferably very smooth;

the specific surface area of the particles is approximately 20 to 60 sq.m../g (BET);

the density of the particles is adjustable at will between 1.2 and 2.2, and depends in particular on the proportion of the reactants employed;

the chemical composition of the support is as follows:
a. the support contains in addition to magnesium chloride a chlorinated compound of aluminium in a quantity such that the atomic ratio Al:Mg is comprised between 0.001 and 0.1; this chlorinated compound of aluminium can be aluminium trichloride and/or an alkyl aluminium chloride, such as for example, a dialkyl aluminium chloride;
b. in order to prepare catalysts intended for the polymerisation and copolymerisation of ethylene the atomic ratio Cl:Mg of the support is slightly less than [2+(3Al/Mg)]; the support contains both products with an Mg—C bond and an electron donor compound in a low proportion;
c. in order to prepare catalysts intended for the polymerisation and copolymerisation of propylene, the atomic ratio of Cl:Mg is more or less equal to [2+(3Al/Mg)].

The magnesium chloride supports or supports based on magnesium chloride prepared in accordance with the present invention are used for preparing catalysts for the polymerisation or copolymerisation of alpha-olefins.

This catalyst preparation can be carried out by all known methods consisting in depositing on the surface of the support an active product which is a compound such as chloride of a transition metal of groups IV, V and VI of the Periodic Table of Elements, preferably titanium. This metallic compound may be adapted in a known manner to the polymerisation of alpha-olefin which it is desired to perform.

It is important that the supports according to the invention should combine a set of physico-chemical and mechanical properties specially adapted to the preparation of powders of polymers and/or copolymers having a high apparent density, which is of interest on the industrial level, both for processes of polymerisation in suspension in a hydrocarbon and polymerisation without solvent, such as for example in a fluidised bed.

METHOD FOR DETERMINING THE MEAN DIAMETERS BY MASS (Dm) AND BY NUMBER (Dn) OF THE MAGNESIUM CHLORIDE SUPPORT PARTICLES

The mean diameters by mass (Dm) and by number (Dn) of the magnesium chloride support particles are measured on the basis of microscope examinations, by means of the OPTOMAX image analyser (Micro Measurements Ltd., Great Britian). The measuring principle consists in obtaining from the experimental study by optical microscopy of a population of magnesium chloride particles a table of absolute frequencies which gives the number $(n_i)$ of particles belonging to each category (i) characterised by an intermediate diameter $(d_i)$, comprised between the limits of the said category. According to the French Norm NF X 11-630 dated June 1981. Dm and Dn are provided by the following formulae:

$$\text{mean diameter by mass:} Dm = \frac{\Sigma n_i (d_i)^3 d_i}{\Sigma n_i (d_i)^3}$$

$$\text{mean diameter by number:} Dn = \frac{\Sigma n_i \cdot d_i}{\Sigma n_i}$$

The ratio Dm:Dn characterises the particle size distribution; it is sometimes known as the "width of particle size distribution".

Measurement of the OPTOMAX analyser is carried out by means of an inverted microscope which makes it possible to examine suspensions of magnesium chloride particles with an enlargement comprised between 16× and 200×. A television camera picks up the images given by the inverted microscope and transmits them to a computer which analyses the images line by line and dot by dot on each line, in order to determine the dimensions or diameter of the particles and then to classify them.

The following non-restrictive examples illustrate the invention.

EXAMPLE 1

Into a 1-liter glass reactor equipped with an agitator system rotating constantly at 750 revolutions per minute there are introduced under an atmosphere of nitrogen 200 millimoles of secondary-butyl-normal-butylmagnesium and 33.4 millimoles of triethylaluminium, the two compounds being in the form of molar solutions in n-hexane. This mixture is heated to 80° C. with agitation for 2 hours. In this way an addition complex is formed with the formula $Mg(C_4H_9)_2.0.17Al(C_2H_5)_3$. After cooling to 50° C., there are introduced into the reactor 200 millimoles of di-isoamyl ether; after homogenising, there are gradually introduced over 2 hours, maintaining the reaction medium at 50° C., 550 millimoles of t-butyl chloride. This medium is kept at 50° C. for another 2 hours, then the precipitate formed is washed five times with n-hexane. The quantity of t-butyl chloride introduced corresponds to the theoretical quantity necessary to convert the whole of the organomagnesium compound into $MgCl_2$ and of the organoaluminium compound into $AlCl_3$. On examination under the microscope, the precipitate formed is seen to consist of spheroidal particles (the mean ratio of large to small axes, D/d, of the particles being equal to 1.23) with a particle size distribution such that Dm:Dn=1.5 with a mean diameter by mass (Dm) equal to 25 microns.

The product obtained has the following chemical composition per gramme-atom of magnesium: 2.1 gramme-atoms of chlorine, 0.04 gramme-atom of aluminium, 0.05 gramme-equivalent of Mg—C bond and 0.10 mole of di-isoamyl ether.

EXAMPLE 2

The preparation is identical to Example 1, except for the fact that the speed of agitation is fixed at a constant 500 revolutions per minute. On examination under the microscope, the precipitate formed is seen to consist of spheroidal particles, with a particle size distribution such that Dm:Dn=1.2, with Dm=50 microns. It was also found that more than 90 weight % of the particles had a mean diameter between 45 and 55 microns. The product obtained has the following chemical composition per gramme-atom of magnesium: 2.1 gramme-atoms of chlorine, 0.04 gramme-atom of aluminium, 0.05 gramme-equivalent of Mg—C bond and 0.10 mole of di-isoamyl ether.

EXAMPLE 3

Into a 5-liter reactor of stainless steel, equipped with an agitator system rotating at a constant 600 revolutions per minute, there are introduced 1720 ml of a solution of butyloctylmagnesium in n-hexane containing 1500 gramme milliatoms of magnesium and 1500 ml of a molar solution of triethylaluminium in hexane. The reaction medium is heated to 80° C., then maintained at this temperature for 2 hours. In this way an addition complex is formed between the organomagnesium compound and the organoaluminium compound containing one mole of triethylaluminium per gramme-atom of magnesium. After cooling to 50° C., 500 ml of n-hexane and 15.6 ml (75 millimoles) of di-isoamyl ether are added to the reaction medium and there are gradually added over 3 hours 505 ml of a mixture containing 3600 millimoles of t-butyl chloride and 450 millimoles of di-isoamyl ether. At the end of this addition, the medium is maintained under agitation for two-and-a-half hours at 50° C. The precipitate obtained is washed five times with n-hexane.

The solid product obtained has the following chemical composition per gramme-atom of magnesium: 2.08 gramme-atoms of chlorine, 0.05 gramme-atom of aluminium, 0.07 gramme-equivalent of Mg—C bond and 0.07 mole of di-isoamyl ether. On examination under the microscope, the solid product is seen in the form of spheroidal particles (the mean ratio of large to small axes, D/d, of the particles being equal to 1.15), with a particle size distribution such that Dm:Dn=1.1, and Dm=34 microns; less than 0.1% by weight of particles of a diameter less than 4 microns are found; the particles have a smooth surface; the density of the product is equal to 1.9 and its specific surface area to 42 sq.m./g (BET).

EXAMPLE 4

Into a 5-liter reactor of stainless steel, equipped with an agitator system rotating at 400 revolutions per minute there are introduced 1720 ml of a solution of butyloctylmagnesium in n-hexane containing 1500 gramme-milliatoms of magnesium and 250 ml of a molar solution of triethylaluminium in hexane. The reaction medium is heated to 80° C., and maintained for 2 hours with the same agitation at this temperature. In this way an addition complex is formed between the organomagnesium compound, and the organoaluminium compound, containing 0.17 mole of triethylaluminium per gramme-atom of magnesium. The addition complex is cooled to ambient temperature (20° C.) and isolated outside the reactor under an atmosphere of nitrogen.

Into this same reactor, cleaned with n-hexane, there are introduced 500 ml of n-hexane and 9.4 ml (45 millimoles) of di-isoamyl ether. The reactor is heated to 50° C. and there are introduced gradually and simultaneously over one hour on the one hand 657 ml of the solution of the addition complex prepared previously and on the other hand 168 ml of a mixture comprising 1200 millimoles of t-butyl chloride and 150 millimoles of di-isoamyl ether, the speed of agitation being maintained at 400 revolutions per minute during the first half-hour of gradual and simultaneous introduction of the reactants, and then being abruptly fixed at 800 revolutions per minute. After the gradual and simultaneous introduction of the reactants, the same agitation at 800 revolutions per minute is maintained and there are introduced into the reaction medium all at once and rapidly 1313 ml of the solution of the addition complex prepared previously, then gradually over 2 hours 337 ml of a mixture containing 2400 millimoles of t-butyl chloride and 300 millimoles of di-isoamyl ether. The speed of agitation is then reduced to 400 revolutions per minute, and the mixture is maintained at 50° C. for two-and-a-half hours.

The solid product is washed five times with n-hexane. It has the following composition per gramme-atom of magnesium: 2.10 gramme-atoms of chlorine, 0.05 gramme-atom of aluminium, 0.05 gramme-equivalent of Mg—C bond and 0.03 mole of di-isoamyl ether. On examination under the microscope, the solid support is seen in the form of spheroidal particles, with a particle size distribution such that Dm:Dn=2.5, and Dm=20 microns; the spheroidal particles have a smooth surface without any uneveness; the density of the product is equal to 1.95.

We claim:

1. Catalyst supports for the polymerization and copolymerization of alpha-olefins, especially ethylene and propylene, consisting essentially of magnesium chloride, characterized by that they contain a chlorinated compound of aluminium in a quantity such that the atomic ratio of Al:Mg is comprised between 0.001 and 0.1 and that they occur in the form of spheroidal particles having a mean diameter by mass, Dm, comprised between 10 and 100 microns and a narrow and controllable particle size distribution such that the ratio of the mean diameter by mass Dm to the mean diameter by number Dn of the particles is below or equal to 3.

2. Supports in accordance with claim 1, characterized in that the spheroidal particles of magnesium chloride have a particle size distribution such that the ratio Dm/Dn of the mean diameter by mass to the mean diameter by number of particles is comprised between 1.1 and 2.5.

3. Supports in accordance with claim 1, characterised in that the spheroidal particles of magnesium chloride have a particle size distribution such that the ratio Dm/Dn is comprised between 1.1 and 1.5.

4. Supports in accordance with claim 1, characterized in that the spheroidal particles of magnesium chloride have a particle size distribution such that the ratio Dm/Dn is comprised between 1.5 and 2.5.

5. Supports in accordance with claim 1, characterized in that the spheroidal particles of magnesium chloride have a particle size distribution such that more than 90% by weight of the particles of each batch are in the range Dm±10%.

6. Supports in accordance with claim 1, characterized in that the spheroidal particles of magnesium chloride have a specific surface area of approximately 20 to 60 sq.m./g (BET) and have a smooth surface.

7. Supports in accordance with claim 1, characterized in that they comprise, in addition to magnesium chloride and a chlorinated compound of aluminium, products having at least one Mg—C bond and small quantities of an electron donor compound, and in that their density is comprised between 1.6 and 2.2.

8. Supports in accordance with claim 1, characterized in that they do not comprise any products having at least one Mg—C bond but contain small quantities of an electron donor compound, and in that their density is comprised between 1.2 and 2.1.

9. Process for the preparation of a catalyst support in accordance with claim 1, by reacting an organomagnesium derivative and a chlorinated organic compound in a liquid hydrocarbon medium, characterized in that the said reaction is performed under the following conditions:

an organomagnesium derivative is an addition complex of the formula $R_1MgR_2.xAl(R_3)_3$ in which $R_1$, $R_2$ and $R_3$ are identical or different alkyl radicals having 2 to 12 carbon atoms and x is comprised between 0.001 and 10, the chlorinated organic compound is an alkyl chloride of the formula $R_4Cl$, in which $R_4$ is a secondary or tertiary alkyl radical having 3 to 12 carbon atoms, the molar ratio between this chlorinated organic compound and the organomagnesium derivative being comprised between $1.5(1+3/2x)$ and $2.5(1+3/2x)$, the reaction is carried out in the presence of an electron donor compound, comprising at least one atom of oxygen, sulphur, nitrogen and/or phosphorus, in a quantity such that the molar ratio between this electron donor compound and the organomagnesium derivative is comprised between 0.01 and 2, and the reaction takes place under agitation, in a liquid hydrocarbon at a temperature between 5° and 80° C.

10. Process in accordance with claim 9, characterized in that the electron donor compound is an aliphatic ether oxide of the formula $R_5OR_6$, in which $R_5$ and $R_6$ are identical or different alkyl radicals having 1 to 12 carbon atoms.

11. Process in accordance with claim 10 characterised in that the reaction is carried out under the following conditions:

the organomagnesium derivative is a derivative having the formula $R_1MgR_2.xAl(R_3)_3$, wherein $R_1$, $R_2$ and $R_3$ are alkyl radicals having 2 to 12 carbon atoms and x is between 0.001 and 10, the chlorinated organic compound is an alkyl chloride having the formula $R_4Cl$ wherein $R_4$ is a secondary, or a tertiary alkyl radical having 3 to 12 carbon atoms, the molar ratio between the chlorinated organic compound and the organomagnesium derivative being comprised between $1.5(1+3/2.x)$ and $2.5(1+3/2.x)$, the reaction is carried out in the presence of an ether-oxide having the formula $R_5OR_6$ wherein $R_5$ and $R_6$ are alkyl radicals having 1 to 12 carbon atoms, the molar ratio of the ether-oxide to the organomagnesium derivative being comprised between 0.03 and 2, the reaction is carried out in an agitated liquid hydrocarbon medium and at a temperature between 35° and 80° C.

12. Process in accordance with claims 9 or 11 characterized in that the organomagnesium derivative has the formula $R_1MgR_2.xAl(R_3)_3$ wherein x is between 0.01 and 2.

13. Process in accordance with claim 9, characterized in that the reaction is performed by introducing the chlorinated organic compound gradually into the liquid hydrocarbon medium containing the organomagnesium derivative.

14. Process in accordance with claim 9, characterized in that the reaction is performed under constant agitation throughout the entire duration of the reaction.

15. Process in accordance with claim 13, characterized in that the speed of agitation is modified at a moment when the quantity of chlorinated organic compound introduced gradually into the liquid hydrocarbon medium containing the organomagnesium derivative corresponds to a molar ratio of $R_4Cl:R_1MgR_2.xAl(R_3)_3$ of less than or equal to 0.25.

16. Process in accordance with claim 9, characterized in that the reaction is performed by introducing, in a first stage, in a gradual and simultaneous manner the organomagnesium derivative and the chlorinated organic compound into the liquid hydrocarbon medium, in quantities such that at most 50% of the quantities of each of the reactants employed is introduced, then in a second stage there is introduced first of all the remaining quantity of the organomagnesium derivative rapidly, and then the remaining quantity of the chlorinated organic compound gradually, into the reaction medium.

17. Process in accordance with claim 16, characterized in that the reaction is performed by modifying the speed of agitation at any moment during the stage of gradual and simultaneous introduction of the organomagnesium derivative and the chlorinated organic compound into the liquid hydrocarbon medium.

18. Process in accordance with claim 9, characterized in that the molar ratio between the chlorinated organic compound and the organomagnesium derivative is comprised between $1.85(1+3/2x)$ and $1.95(1+3/2x)$ and that the product obtained is used for preparing the catalyst for polymerizing or copolymerizing ethylene or propylene.

19. Process in accordance with claim 9, characterized in that the molar ratio between the chlorinated organic compound and the organomagnesium derivative is comprised between $1.95(1+3/2x)$ and $2.2(1+3/2x)$, and that the product obtained in used for the preparation of catalyst for polymerizing or copolymerizing propylene.

20. Process in accordance with claim 9, characterized in that the molar ratio between this electron donor compound and the organomagnesium derivative is comprised between 0.01 and 1.

21. Catalyst supports for the polymerization and copolymerization of alpha-olefins, especially ethylene and propylene, consisting essentially of magnesium chloride, characterized by that they contain a chlorinated compound of aluminium in a quantity such that the atomic ratio of Al:Mg is comprised between 0.001 and 0.1 and that they occur in the form of spheroidal particles having a mean diameter by mass, Dm, comprised between 10 and 100 microns and a narrow and controllable particle size distribution such that more than 90% by weight of the particles of each batch are in the range $Dm \pm 10\%$.

* * * * *

UNITED STATES PATENT AND TRADEMARK OFFICE
CERTIFICATE OF CORRECTION

PATENT NO. : 4,487,846
DATED : December 11, 1984
INVENTOR(S) : JEAN C. BAILLY et al It is certified that error appears in the above-identified patent and that said Letters Patent is hereby corrected as shown below:

Col. 6, line 13, 2nd equation, After "mean diameter by number:" --Dn-- is omitted Col. 10, claim 19, line 46, "in" should read --is--

Col. 10, claim 19, line 47, "catalyst" should read --catalysts--

Signed and Sealed this

Second Day of July 1985

[SEAL]

Attest:

DONALD J. QUIGG

Attesting Officer

Acting Commissioner of Patents and Trademarks